Figure 1:
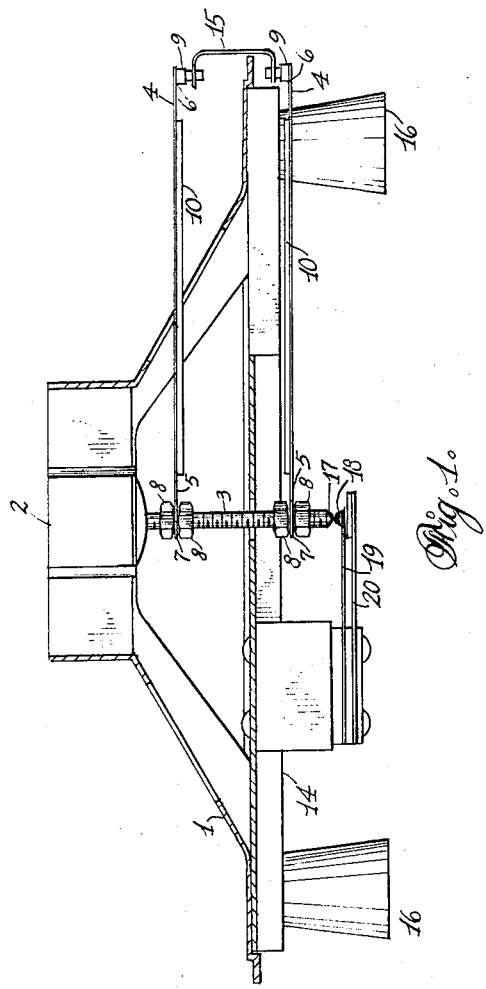

May 21, 1968  R. L. G. GILBERT  3,383,915

DEEP-WATER WAVE RECORDER

Filed Oct. 22, 1965  6 Sheets-Sheet 1

INVENTOR
Reginald L. G. Gilbert
BY
Harold G. Weir
PATENT AGENT

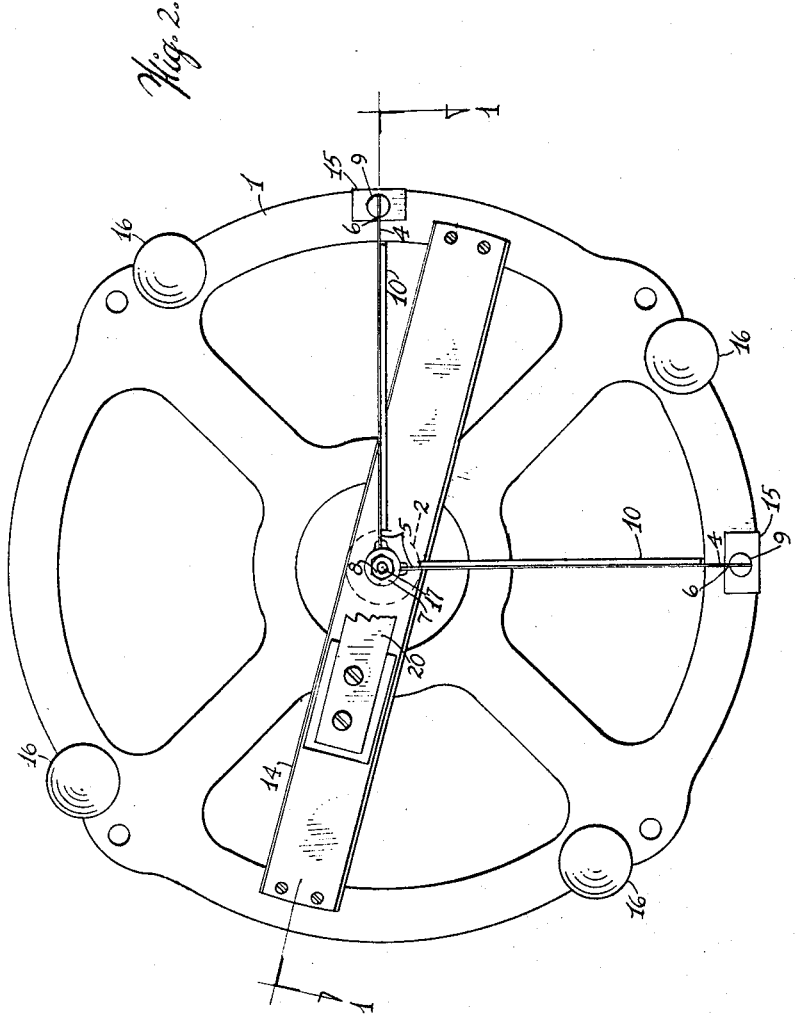

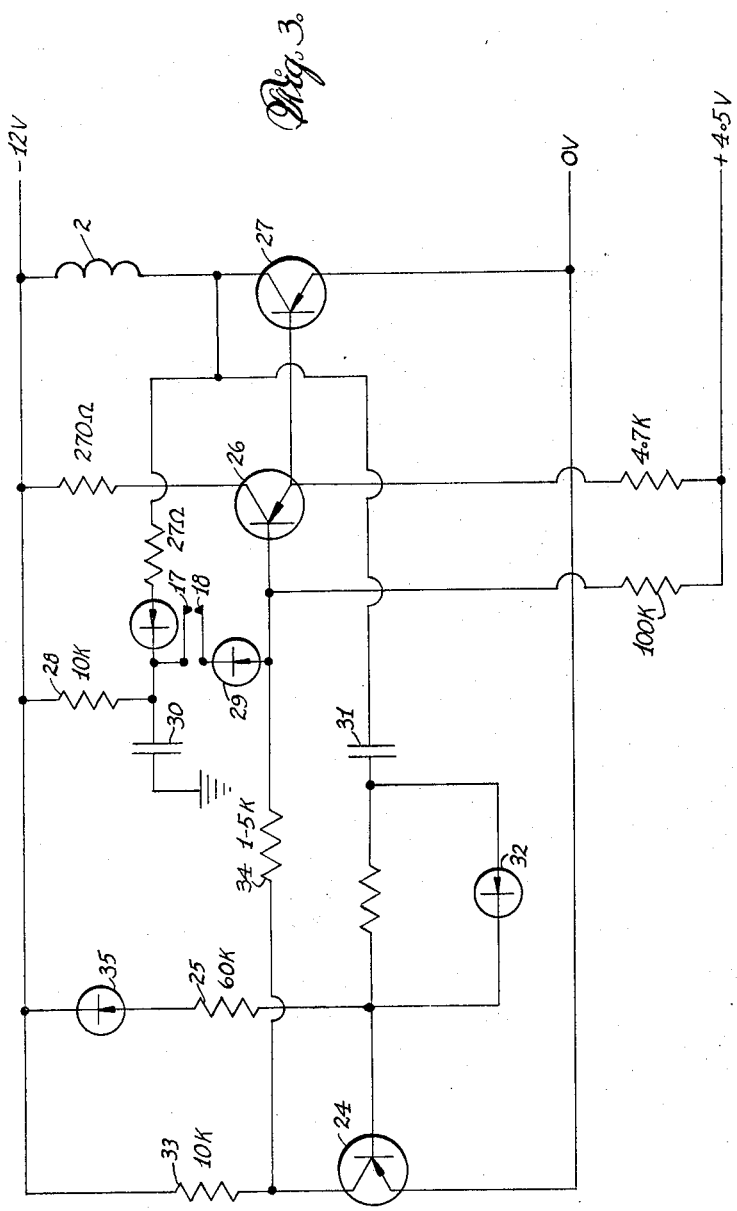

May 21, 1968  R. L. G. GILBERT  3,383,915
DEEP-WATER WAVE RECORDER
Filed Oct. 22, 1965  6 Sheets-Sheet 4

INVENTOR
Reginald L. G. Gilbert
BY
Harold A. Wein
PATENT AGENT

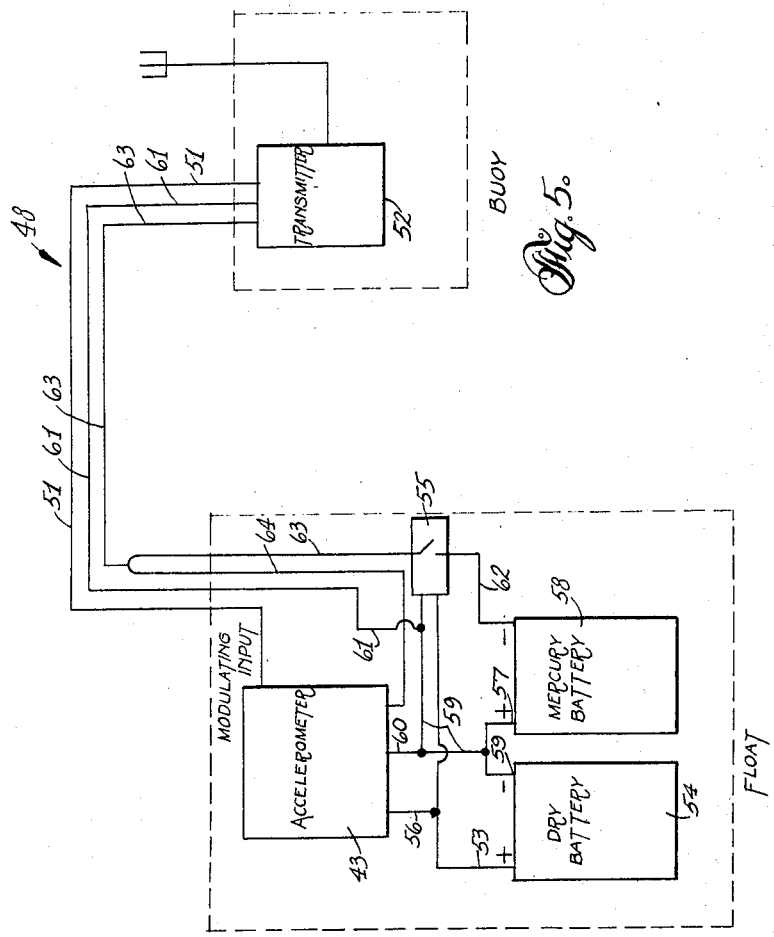

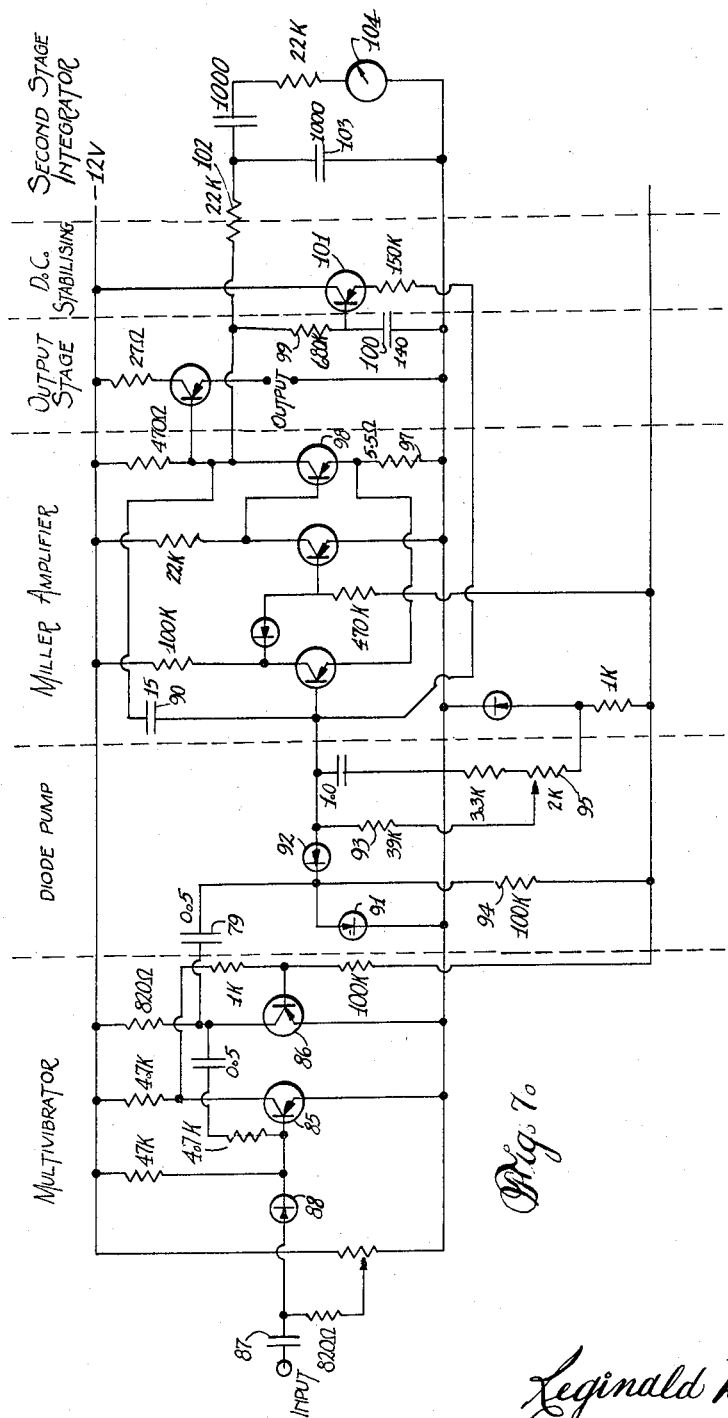

United States Patent Office 3,383,915
Patented May 21, 1968

3,383,915
DEEP-WATER WAVE RECORDER
Reginald L. G. Gilbert, Dartmouth, Nova Scotia, Canada, assignor to Canadian Patents and Development Limited, Ottawa, Ontario, Canada, a corporation of Canada
Filed Oct. 22, 1965, Ser. No. 501,632
13 Claims. (Cl. 73—170)

This specification relates to accelerometers and to the use of such in motion recorders and in particular to wave motion recorders.

It is an object of the present invention to provide an improved accelerometer, particularly for use in detecting, and measuring, motions of low frequency. A further object is the provision of apparatus for detecting and indicating the spectra of motions of low frequency such as wave spectra of water surfaces.

It is often desirable, or even necessary, to measure wave spectra at locations remote from a shore or similar fixed position. The measuring apparatus should therefore be capable of operating for long terms unattended. To obtain long terms it is necessary to reduce power consumption to a minimum. Further, to enable recordings to be made automatically and to reduce the need for skilled staff to a minimum, it is desirable that any indicating and/or recording apparatus should be reliable.

Generally, to minimize loss if a wave measuring apparatus breaks loose, a radio telemetering system is preferable. A difficulty with present apparatus of such type is that the radio frequency stability is poor, necessitating frequent tuning of the receiver. Power requirements are also high, leading to limits of one week unattended operation.

It is another object of the present invention to provide apparatus for measuring wave motion which can be left to operate unattended for long periods and which will not require constant adjustment.

It is a further object of the invention to provide apparatus for measuring wave motion in which an accelerometer is used, the output of which has a frequency which is proportional to acceleration, the output being used to modulate a radio signal.

Accordingly, in one aspect, there is provided an accelerometer comprising a stator adapted to be moved by the motion to be detected and measured and an element movable relative to the stator in a direction substantially parallel to the movement of the stator, the element arranged to be urged gravitationally to a neutral position relative to the stator; and means for applying a pulse to move the element relative to the stator when the element is in the neutral position.

In another aspect, there is provided apparatus for the recording of the profile of a wave motion comprising, a stator moved in a vertical direction by the wave motion, an element movable relative to said stator in a direction substantially parallel to the movement of said stator, said element arranged to be urged gravitationally to a neutral position relative to the stator, pulse producing means for applying a pulse to said element to move it relative to said stator, switching means controlling said pulse producing means and operative to activate the pulse producing means when said element is in the neutral position, detecting means for detecting the frequency of the pulses applied to said element, and integrating means for integrating the frequency of said pulses to give an output which is a parameter of the displacement of the stator by the wave motion.

Figure 6:
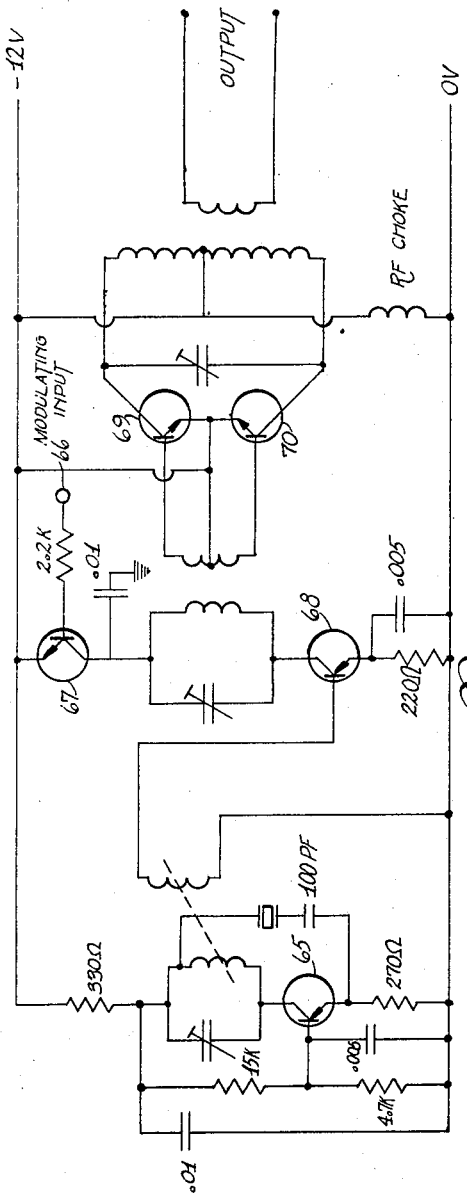
Figure 4:
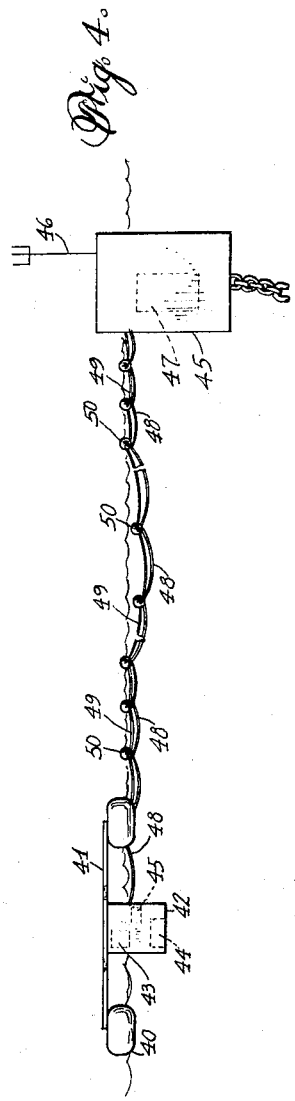

The invention will be readily understood by the following description of a particular embodiment, by way of example, in conjunction with the accompanying drawings, in which FIGURE 1 is a diagrammatic vertical cross-section through one form of accelerometer, on the line 1—1 of FIGURE 2, FIGURE 2 is a diagrammatic inverted plan view of the accelerometer in FIGURE 1, part of the structure omitted for clarity, FIGURE 3 is a circuit diagram of one convient form of multivibrator, FIGURE 4 is a neutral cross-section illustrating an arrangement for supporting the accelerometer to measure surface waves on sea, FIGURE 5 is a digrammatic circuit arrangement of accelerometer and associated equipment, FIGURE 6 is a circuit diagram of one convenient form of transmitter and appears on the same sheet as FIGURE 4, and FIGURE 7 is a circuit diagram of a convenient integrator.

FIGURES 1 and 2 illustrate a convenient way of making an accelerometer in which a coil forms the moving element, the element moving within a permanent magnet. It comprises a moving coil loudspeaker with the cone removed. The frame and magnet of the loudspeaker form a housing 1, which in the present example is considered as the stator, and the coil forms an element 2 movable relative to the housing 1. To the element 2 is attached a brass screw 3. Four ligaments 4 are attached at their inner ends 5 to the brass screw 3 and at their outer ends 6 to the housing. The ligaments 4 are in two pairs, one pair being at right angles to the other pair, the ligaments in each pair being substantially parallel to each other. A convenient way of attaching the inner ends of the ligaments is to solder them to plates 7 clamped between nuts 8 on the brass screw 3. The outer ends 6 are conveniently attached by soldering to the heads of small screws 9 on the housing 1.

The ligaments 4, in the example described, are each made from a length of hardened beryllium copper wire with a central stiffener 10. In the present example the wire is 0.015 inch diameter and about 10 cms. long with approximately 1 cm. at each end not stiffened. The stiffeners are made of 0.005 inch thick brass, bent at 90° to form an angle of 1 mm. side. The stiffeners are soldered to the wires.

The ligaments 4 allow the element 2 to move along the arc of a circle. To provide sufficient lateral clearance the gap of the loudspeaker magnet may need to be increased. For an eight-inch loudspeaker, with a 6-oz. magnet, about .012 inch are turned off the faces of both the outer and inner pole-pieces. In the case of a loudspeaker with an alloy magnet, the whole is dismantled and the magnet remagnetized after reassembling. If a loudspeaker with a ferrite magnet is used, the centre pole may be pressed out and both faces machined; after removing all steel chippings from the magnet and outer pole-piece, the pole-piece may be pressed back in place, and it will be found that the field strength has decreased very little.

The housing 1 has a steel channel 14 fastened to it. The channel is made of ⅟₁₆-inch thick steel, is about 1½ inches wide and has ¼-inch wide flanges at each side. A ⅜-inch diameter hole is drilled in the centre of the channel through which the brass screw 3 passes. Either the magnet assembly or the channel is removable from the loudspeaker frame to enable the accelerometer to be assembled; the accelerometer shown has a removable channel. Two brackets 15 are welded or brazed to the frame, on which are mounted the screws 9 to which the ligaments 4 are soldered. Lock-nuts are fitted to the brass screw 3 to act as stops to prevent excessive movement of the element 2 when the accelerometer is transported. Legs 16 may be provided so that the accelerometer may stand on a bench, with the magnet uppermost, without damaging the ligaments.

A hole is drilled in the end of the brass screw 3 and a first gold contact 17 soldered to the end. A second small gold contact 18 is rivetted to spring 19 the spring and contact being mounted on but insulated from the channel 14. The contact 18 on the spring 19 should be light and the resonant frequency of contact and spring should be about 1,000 c./s. A small pad of rubber, 3/16-inch square by about 2 millimeters thick is mounted on a 1/16-inch thick brass strip 20, and the end of the spring 19 rests lightly on it, the pad acting as a damper for the spring.

When the two contacts meet, a multivibrator circuit is triggered which passes a short pulse of current through the coil to provide a mechanical impulse to the element to move it upwards relative to the housing. The element continues in free fall until the contacts come together again. In order to economize on battery power, when the contacts are closed the coil should be in the position, relative to the magnet, which gives maximum force for a given current.

The accelerometer operates on the following basis: if an element, of mass $m$, is given an upward momentum of $mv$., relative to a housing moving with an acceleration of "$a$" relative to the earth, the following equations apply.

At time $t=0$, let the velocity of the housing be $V$ upwards. Then the velocity of the element, relative to earth, is $v+V$.

At time $t=t$, the velocity of the element is $$v+V-gt \qquad (1)$$

relative to the earth, and it has moved $$(v+V)t-\tfrac{1}{2}gt^2 \qquad (2)$$

At time $t=t$, the housing has velocity $V-at$ (3) relative to the earth, and has moved $Vt-\tfrac{1}{2}at^2$ (4)

When the element has returned to its starting position relative to the housing, these two distances are equal, so that $$(v+V)t-\tfrac{1}{2}gt^2=Vt-\tfrac{1}{2}at^2 \text{ (from 2 and 4)}$$

or $$vt=\tfrac{1}{2}gt^2-\tfrac{1}{2}at^2 \qquad (5)$$

and $$t=\frac{2v}{g-a} \qquad (6)$$

The relative velocity between the element and the housing is $$v+V-gt-(V-at) \text{ (from 1 and 3)}$$
$$=v-gt+at \text{ or } v-(g-a)t \qquad (7)$$

and when $$t=\frac{2v}{g-a}$$

the relative velocity is $$v-(g-a)\frac{2v}{g-a}=-v$$

If an upward impulse of 2 mv. is given to the element, the initial conditions are re-established, and the cycle repeats.

Then the frequency of impulses $$\frac{1}{t}=\frac{g-a}{2v} \qquad (8)$$

This is the basis for the accelerometer, which gives a pulse frequency proportional to $(g-a)$.

It will be appreciated that other arrangements of element 2 and housing 1 can be provided. For example, instead of a permanent magnet being mounted on the housing and a coil used for the element, a coil can be mounted on the housing, the pulses from the multivibrator being applied to the coil and actuating an element which is a normal armature, such as in a solenoid.

The circuit of a suitable multivibrator is shown in FIGURE 3. Transistor 24 is normally conducting, more base current being supplied by resistance 25 than is required for the collector current. The collector potential of 24 is approximately 0 v., so that the base potential of transistor 26, and hence transistor 27 is positive. Thus transistor 27 is cut off and no current flows in the accelerometer coil forming the element 2. When the circuit is first switched on, current flows via resistance 28, the contacts 17 and 18 and Zener diode 29 to the base of transistor 26 so that transistor 27 is turned on and the element 2 is driven upwards; the contacts 17 and 18 then open, and the drive to transistor 26 is removed. Condenser 30 charges, via resistance 28, to −12 v. so that when the element 2 falls and the contacts close transistors 26 and 27 are turned on. The collector of transistor 27 rises abruptly to 0 v., and a 12 volt positive pulse is applied, via condenser 31 and diode 32 to the base of transistor 24, which is cut off and so a further drive to the base of transistor 26 is provided via resistances 33 and 34.

The base potential of transistor 24 falls exponentially with a time constant depending on condenser 31 and resistance 25 until transistor 24 conducts. At this time the contacts will be open, so that transistors 26 and 27 are then cut off and remain off until the contacts 17 and 18 close once again. The pulse repetition frequency is set to 30 c./s. by adjusting resistance 25, the coil assembly moving through a distance of about 1.5 mm. and the duration of the pulse being about 2 msec. As soon as the collector of transistor 27 moves positively to ground, the Zener diode 35 conducts so that the potential of condenser 30 goes to about −½ volt. After transistor 27 has stopped conducting, the potential of condenser 30 falls exponentially towards −12 volts, with a time constant of 20 milliseconds; thus, for a period of about 10 milliseconds, the potential of X is more positive than −4 volts, so that if, due to contact bounce, the contacts should make again during that period, no current will flow through Zener diode 29 to the base of transistor 26 and so transistor 27 and "double pulsing" is prevented.

The Zener diode 35 minimizes the variation of accelerometer frequency with power supply voltage change. If the supply voltage falls to 10 volts, the current through the coil falls to 5/6; in order to keep the impulse on the coil constant, the pulse duration must increase proportionately. The potential of the base of transistor 24, when the transistor is cut off, is falling exponentially towards the voltage of point X which is at about −6 volts with −12 volt supply and −4 volts with a 10 volt supply, and so the pulse length varies with the supply voltage in such a manner that the impulse on the coil is approximately constant.

At this position there is available a frequency output signal the frequency varying with acceleration of the housing. It is possible to feed the signal directly to an integrating circuit and then to a recorder to make a self-contained unit. However, when the apparatus is to be used to measure waves some distance from a base and is to be left unattended for long periods, several disadvantages arise. Firstly, the power requirements are likely to rise requiring longer batteries or shorter service periods. Again, the information is not available until the apparatus is sevriced whereas it may be desirable to compare the results from several sources without delay. Also, if the apparatus breaks loose, a lot of apparatus is lost and also the information collected since the previous servicing.

Therefore, in the present example, the apparatus is arranged to transmit the frequency output signal, further processing of the signal being carried out at the receiving station. However, it should be appreciated that the intermediate step of transmitting the signal, from the apparatus so far described, to a receiving station, can be omitted.

Turning now to FIGURE 4, this illustrates the arrangement for supporting the accelerometer.

The accelerometer is mounted on a small float 40, made approximately in the shape and size of a life-belt from fibreglass coated foam plastic. A sheet of plywood 41 is fastened across the top of the ring and a water-tight brass can 42 is bolted to the underside of the plywood 41 so that the can 42 is in the centre of the ring. The accelerometer indicated generally at 43, is mounted in the can, together with batteries 44 and a time switch 45 which switches on the equipment for 35 minutes every six hours. A 28 amp-hour mercury battery may be used for the main 12 volt supply and will last for about 4 months.

The float 40 is moored to a large buoy 45 which carries the radio antenna 46 and transmitter 47 and is itself moored to the sea floor. Electrical power for the transmitter 47 and the signal from the accelerometer 43 are transmitted along a cable 48 which is attached to a mooring line 49 extending between the float 40 and the buoy 45. Watertight plugs and sockets are fitted at each end of the cable. The mooring line 49 is of 3/16-inch stainless steel stranded wire rope, and has small plastic floats 50 threaded on it. The electrical cable 48 is held to the wire rope by taping at about 4 foot intervals, and the taping can also hold the floats in position. In a typical example, the total length of the mooring wire is 250 feet. 50 feet at each end has sufficient floats to make it buoyant, and the rest has fewer floats so that it just sinks. This arrangement was found to reduce "tugging" on the float due to relative horizontal movements between the float and the buoy. When the float and the buoy separate, a length of the floating cable at each end is pulled under the surface and very little horizontal force is exerted on the float.

FIGURE 5 illustrates diagrammatically the circuit arrangement for the float and buoy. The frequency output signal is fed from the accelerometer 43 via one core 51 of the cable 48 to the transmitter 52. A lead 53 connects the positive side of 4½ volt, 1 ampere hour battery 54 to the one side of the operating mechanism of a time switch 55, a lead 56 also connecting this supply to the accelerometer 43. The positive terminal 57 of the 12 v. mercury battery 58 and the negative terminal 57 of the 4½ volt battery 54 are connected and a lead 59 connects to the other side of the operating mechanism of the time switch 55. A lead 60 also connects lead 59 with the accelerometer 43. A further lead 61 connects from lead 59 to the transmitter 42, the lead 61 forming a further core of the cable 48. The negative side of the 12 volt battery 58 is connected via lead 62 to one contact of the time switch 55, the other contact of the time switch being connected to the transmitter 52 via a lead 63 which forms another core at the cable 48.

A four pin connection is made, by a watertight plug, at the float end of the cable 48. A tapping from the lead 63 in the cable 48 is fed back, via lead 64, to the accelerometer and thus activation of the accelerometer does not occur until the cable 48 is plugged into the float. Connection of the cable 48 with the transmitter is by a three pin water-tight plug.

To test the requirements for the transmitter, experiments were carried out with a commercial 100 milliwatt radio transmitter over a sea path of 4 miles. Transmissions were received, even when the transmitted power was reduced to 1 milliwatt, with a receiver with a 4 microvolt sensitivity. A headland was used to "simulate" a wave. The signal was received with 100 milliwatts peak transmitted power, with a 30 foot hill between the transmitter and receiver, and it was considered that by using a receiver with 1 microvolt sensitivity and a 1 watt peak transmitter, reception would be possible at a range of 10 miles with the transmitter in the trough of a 30 foot wave.

A transistorized transmitter is desirable, as the heater power required for vacuum tubes is eliminated, and so the power saving from the short duration of the transmitted pulses is realized to the full. The transmitter proproposed takes 250 milliwatt of DC power, when giving 1 watt peak pulses of R.F. energy with a duty cycle of 1 in 15, so that the theoretical economies of pulse code modulation are realized in practice.

The circuit of a suitable transmitter is shown in FIGURE 6. Transistor 65 with accompanying resistors and condensers, is a third overtone crystal-controlled oscillator, which runs continuously. The "modulating input" 66, which is the frequency output signal from the accelerometer, is connected to the collector of transistor 27 of the multivibrator circuit described above, so that when the accelerometer coil has current flowing in it, the modulating input is at 0 v., and transistor 67 conducts. Transistor 68 then has a power supply to its collector circuit, and acts as a Class C amplifier, driving the push-pull output stage transistors 69 and 70. The transmitter gives pulses of over 1 watt R.F. power, the watt power output depending upon the particular transistors. The total DC input power to the transmitter and accelerometer is 1 watt.

The radio signal is received by a narrow-band crystal-controlled receiver, a typical example being a modified Knight-Kit citizen's band transmitter-receiver. Non-standard crystals are used in the crystal-controlled oscillator, and the tuning coils are modified to suit the frequency of the transmitter. The pulsed R.F. signal has a very low mean value, so that the normal AVC circuit does not function adequately, and a peak diode circuit is used to generate the AVC voltage.

The bandwidth of the receiver is 1,000 c./s., so that the transmitter oscillator can drift by several hundred cycles per second without appreciably affecting reception. The received pulses are clipped at two levels and amplified to produce clean pulses 12 volts in amplitude, with a minimum of interference.

The pulse rate is integrated by the circuit shown in FIGURE 7, the circuit comprising a multivibrator 71, diode pump 72, a Miller amplifier 73, an output stage 74, D.C. stabilizing stage 75 and a second stage integrator 76. Each of the various sections and stages of the circuit shown in FIGURE 7 are of conventional form and only the integration of the various sections and stages, one with another, will be described. The multi-vibrator rests with transistor 85 conducting and transistor 86 cut off. The input pulses are AC coupled via condenser 87, to the anode of diode 88. When the anode of diode 88 becomes positive it conducts and transistor 85 is cut off; the multivibrator then produces a square pulse approximately 15 milliseconds long. The multivibrator gives a standard pulse and also gives a little extra protection against interference pulses. The diode pump integrator comprises condenser 89, a Miller capacitance formed by the amplifier and condenser 90, diodes 91 and 92 and a current feed via resistance 93. When the collector of transistor 86 has been in its rest position at −12 v. for a few milliseconds so that the value at condenser 89 is changed to 12 v., the diode 91 will conduct current fed through resistance 94. When the multivibrator triggers, the potential of the collector of transistor 86 rises to 0 v. and diode 91 conducts, heavily at first, and returning to normal after condenser 89 has been discharged. After 15 milliseconds the collector of transistor 86 returns to −12 v., diode 91 is cut off, and diode 92 conducts to recharge condenser 89. Thus an interrupted negative DC current is fed through diode 92, the average value being proportional to the pulse frequency. A positive DC current is fed through resistance 93, its magnitude being adjustable by the setting of resistance 95. It was shown in Equation 8 that the pulse frequency is proportional to $(g-a)$, where $a$ is the wave acceleration to be measured, and the positive DC current is set to be equal to the diode pump current due to $g$, the resultant alternating current being proportional to $a$. The current is fed into a virtual capacitor formed by the Miller amplifier and condenser 90, condenser 96 being included to suppress a tendency for the amplifier to oscillate. The amplifier has three stages, with negative feedback from resistance 97. It has a high input impedance and a gain of 60, so that the effective input capacity is 900 microfarads and the time constant of the integrating circuit 20 seconds. The potential of the collector of transistor 98 is averaged by resistance 99 and condenser 100 (about 50 seconds time constant) and a feedback current provided to the input by transistor 101. In this way, if the mean frequency of the input pulses drops due to battery voltage variation, etc., the steady balancing current to the diode pump is varied to compensate.

The amplified integrated output is taken from the amplifier and fed via an emitter follower to a pen recorder which records the wave velocity. As a guide to the operator, the output is integrated again to give a signal proportional to wave height by resistance 102 and condenser 103, capacitatively coupled to an indicating voltmeter 104.

The pulses from the receiver can also be recorded on a twin track tape recorder, which has timing pulses recorded on the second track tape recorder, which has timing pulses recorded on the second track at one second intervals. On playing back the tape, the received pulses can be continuously numerically integrated with an electronic counter, the contents of the counter being printed or punched at each timing pulse. Further integration, to find the wave height, can be performed arithmetically.

I claim:

1. Apparatus for indicating a parameter of a reciprocating motion comprising, a stator for movement by said motion, an element freely movable relative to the stator in a direction substantially parallel to the movement of the stator, the element arranged to be urged gravitationally to a neutral position relative to said stator, a multivibrator for producing electrical pulses, switch means controlling said multivibrator to apply an electrical pulse to said element when said element is in the neutral position, the frequency of said pulses varying in accordance with the acceleration of the stator.

2. Apparatus as claimed in claim 1 including means for detecting and integrating the frequency of said pulses.

3. Apparatus as claimed in claim 2 including recording means to record the output from said integrating means.

4. Apparatus as claimed in claim 1 including a transmitter for transmitting a signal indicative of said pulse and a receiver for receiving said signal.

5. Apparatus as claimed in claim 4 including means for integrating the frequency of said pulses to give an output related to velocity of movement of the stator.

6. Apparatus as claimed in claim 5 including recording means to record the output from said integrating means.

7. Apparatus as claimed in claim 5 including further integrating means to give an output related to displacement.

8. Apparatus as claimed in claim 7 including recording means to record the output from said integrating means.

9. Apparatus for recording the profile of a deep-water wave comprising: an accelerometer for flotation at the water surface, said accelerometer comprising a stator for movement vertically with the water surface, an element freely movable relative to said stator in a substantially vertical direction and gravitationally urged to a neutral position relative to said stator and means for applying a pulse to said element to move it relative to said stator on each occasion when the element is at said neutral position, the frequency of said pulses varying in accordance with the acceleration of the stator; means for detecting and integrating the frequency of the pulses applied to said element and means for recording the output of said detecting and integrating means.

10. Apparatus for recording the profiles of deep-water waves comprising: an accelerometer for flotation at the water surface, said accelerometer comprising a housing for movement vertically with the water surface, an element freely movable vertically within said housing and gravitationally urged to a neutral position relative to said housing and means for applying a pulse to said element to move it relative to said housing on each occasion when the element is at said neutral position, the frequency of said pulses varying in accordance with the acceleration of said housing; means for detecting and integrating the frequency of the pulses applied to said element and means for recording the output of said detecting and integrating means.

11. Apparatus as claimed in claim 10 wherein said element is the coil of a moving coil loudspeaker and the housing is the supporting structure and magnet of the loudspeaker.

12. Apparatus for recording the profile of deep-water waves comprising: a first floatable member containing an accelerometer comprising a housing for movement with said floatable member on the water surface, an element freely movable vertically within said housing and gravitationally urged to a neutral position relative to said housing, a multivibrator for producing electrical pulses and switch means for applying a pulse to said element each time it is at said neutral position the frequency of said pulses varying in accordance with the acceleration of said housing; a second floatable member containing a radio transmitter; means for connecting the two floatable members including electrical connecting means for connecting said accelerometer to said transmitter, said transmitter adapted to transmit a signal indicative of the application of said pulses to the element, mooring means for mooring said floatable members at the desired location; a receiver for receiving said signals and integrating said signals; and a recorder for recording the output of the receiver.

13. Apparatus as claimed in claim 12 wherein said element is the coil of a moving coil loudspeaker and the housing is the supporting structure and magnet of the loudspeaker.

References Cited

UNITED STATES PATENTS

| 2,049,129 | 7/1936 | McNeil | 73—517 |
| 2,613,071 | 10/1952 | Hansel | 73—517 X |
| 2,846,207 | 8/1958 | Marggraf | 73—517 |
| 2,940,306 | 6/1960 | Lozier | 73—517 X |
| 3,110,178 | 11/1963 | Marks et al. | 73—170 |
| 3,213,694 | 10/1965 | Clark et al. | 73—517 |
| 3,301,048 | 1/1967 | Felsenthal et al. | 73—170 |

RICHARD C. QUEISSER, Primary Examiner.

J. W. MYRACLE, Assistant Examiner.